Jan. 8, 1946.  D. B. HYDE  2,392,532
BIRD HOUSE AND BIRD FEEDING DEVICE
Filed April 21, 1942   3 Sheets-Sheet 1
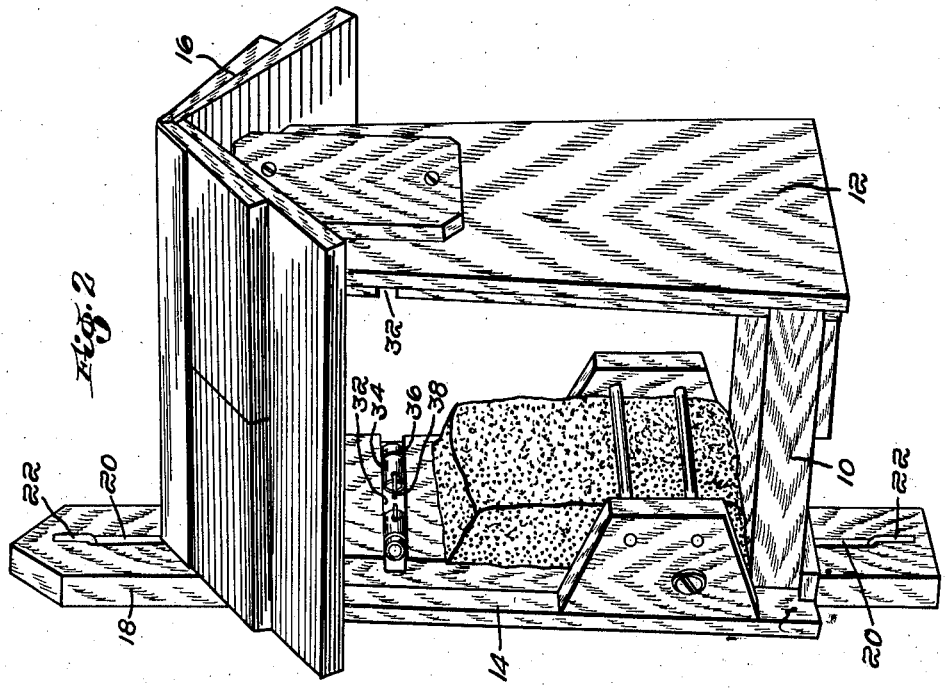
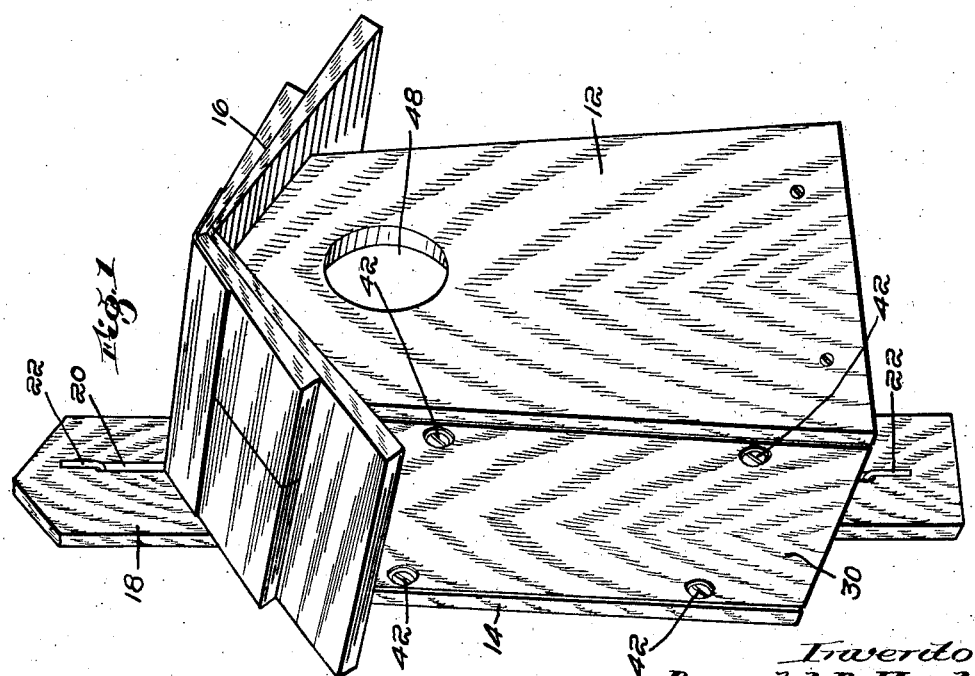
Inventor:
Donald B. Hyde,
by Thomson & Thomson
his Attys Jan. 8, 1946. D. B. HYDE 2,392,532
BIRD HOUSE AND BIRD FEEDING DEVICE
Filed April 21, 1942 3 Sheets-Sheet 2
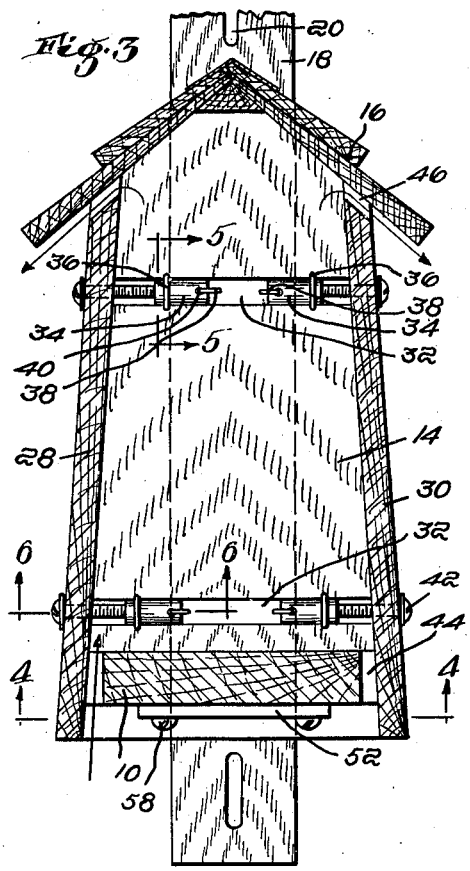
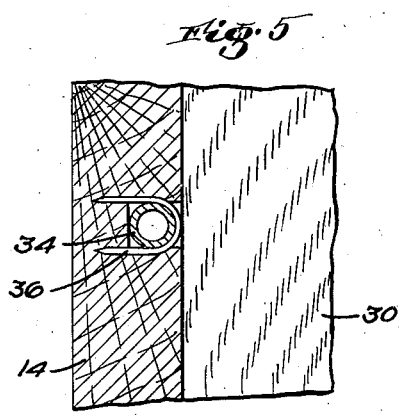
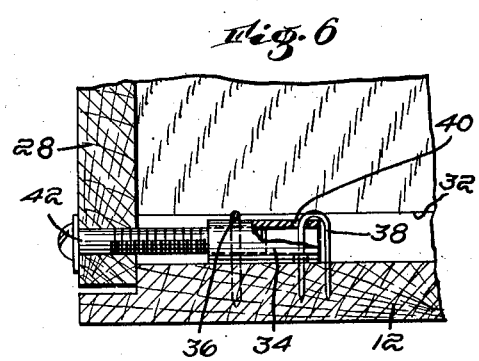
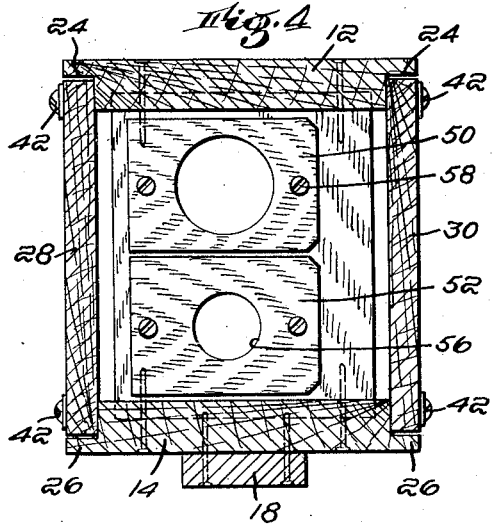
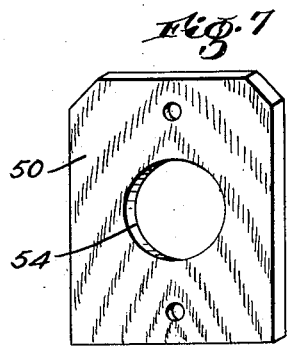
Inventor
Donald B. Hyde,
by Thomson & Thomson
his Attys Jan. 8, 1946.  D. B. HYDE  2,392,532
BIRD HOUSE AND BIRD FEEDING DEVICE
Filed April 21, 1942  3 Sheets-Sheet 3
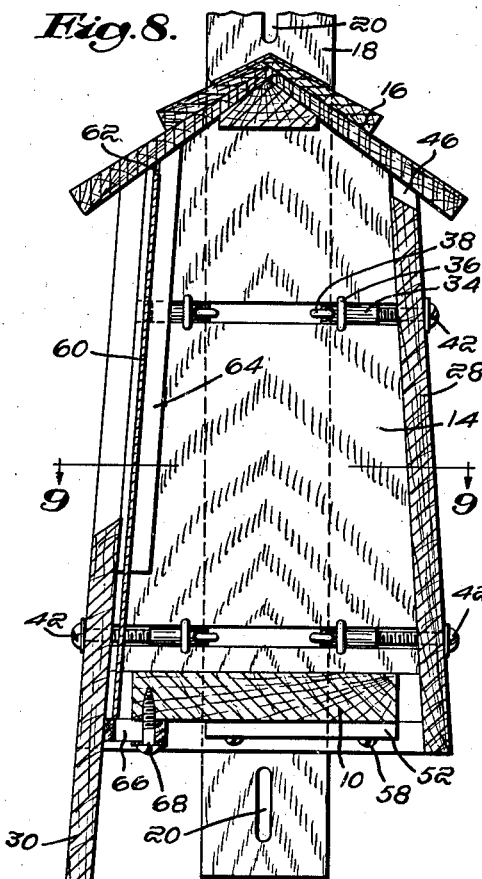
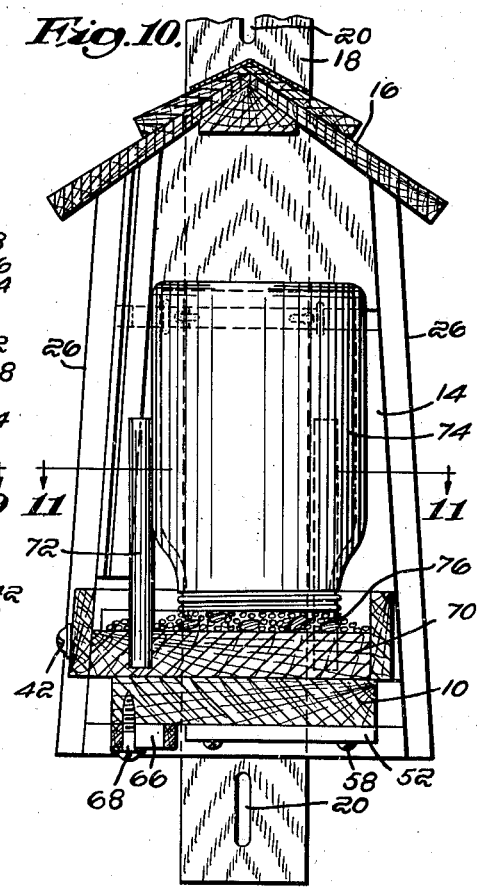
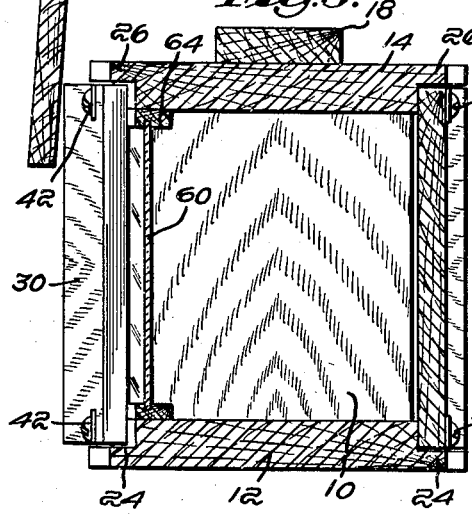
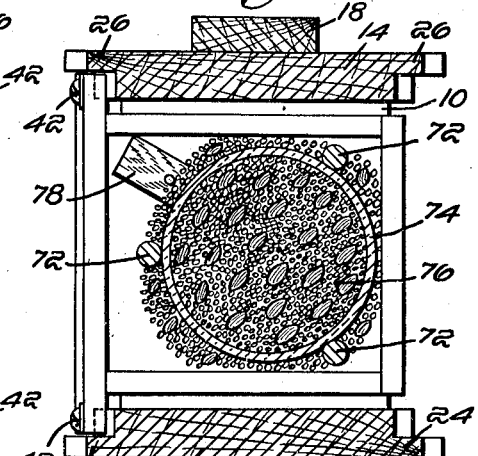
Inventor:
Donald B. Hyde,
by Thomson & Thomson
Attorneys Patented Jan. 8, 1946

2,392,532

UNITED STATES PATENT OFFICE 2,392,532

BIRDHOUSE AND BIRD-FEEDING DEVICE

Donald B. Hyde, Newton, Mass.

Application April 21, 1942, Serial No. 439,806

1 Claim. (Cl. 119—23)

This invention relates to improvements in a bird house and bird feeding device, particularly a device which is convertible so that it may be used either as a closed bird house or as an open bird feeder.

It is an object of my invention to construct a bird house in such a manner that it may be readily converted to an open bird feeder by removing the sides of the bird house and incorporating, if desired, food dispensing equipment for the birds.

It is further an object of my invention to provide novel means for attaching the removable sides of the bird house to the body of the house whereby said means may be employed to secure the removable sides in one of two positions and may also be used after removal of the sides to attach the food dispensing equipment when the device is used as an open bird feeder.

It is further an object of my invention to construct the bird house with a glass window on one side which normally is covered by a removable wooden side of the house whereby the interior of the bird house may be made visible by moving the wooden side of the house to a position in which the glass window is exposed.

A still further object of my invention is the provision of a bird house with novel means for mounting the bird house whereby the house may be readily fixed in position or removed therefrom.

Further objects and advantages of my improvements will be more readily apparent from the following description of preferred embodiments thereof as illustrated in the attached drawings, in which:

Fig. 1 is a perspective view of the convertible bird house and bird feeder used as a bird house;

Fig. 2 is a similar perspective view showing the bird house of Fig. 1 converted into a bird feeding device and having a rack for holding a cake of bird food;

Fig. 3 is a vertical sectional view of the bird house shown in Fig. 1 looking towards the back thereof;

Fig. 4 is a horizontal section taken on the plane indicated 4—4 in Fig. 3;

Fig. 5 is a fragmentary sectional view taken on the plane indicated 5—5 in Fig. 3 and shown in an enlarged scale;

Fig. 6 is a fragmentary sectional view taken on the plane indicated 6—6 in Fig. 3 and shown in an enlarged scale;

Fig. 7 is a perspective view illustrating one of the adapter plates having an opening therein which may be used to vary the size of the opening into the bird house as shown in Fig. 1;

Fig. 8 is a vertical sectional view similar to Fig. 3 but illustrating a modification in which one of the sides of the bird house is provided with a window so that the interior of the house may be visible to the eye of an observer;

Fig. 9 is a sectional view taken on the plane indicated 9—9 in Fig. 8;

Fig. 10 is a vertical sectional view similar to Fig. 3 but illustrating a modification in which a seed holder and feeder has been assembled with the bird feeding device; and Fig. 11 is a sectional view taken on the plane indicated 11—11 in Fig. 10.

The improved bird house and bird feeder disclosed and described herein is designed for ready conversion to adapt it for use in various ways so that it may serve as a bird house in which birds may build a nest, in one form of which a side of the bird house has a window so that an observer may watch the birds in the nest; and the bird house may be adapted to attract only birds of a certain kind by changing the size of the opening by which the birds enter the house by means of adapter plates. After the bird house has served its usefulness as a nesting place, it may be converted into an open bird feeder by removing the sides from the bird house, and when used as a feeder it may be adapted to hold a cake of bird food in a removable rack or to hold a seed feeder which may be removably assembled within the frame of the bird house.

The bird house is designed to be cheaply manufactured principally from wood. The main frame or body of the bird house comprises the floor 10, the front side 12, the rear side 14 and the pitched roof 16. In order to mount the bird house the wood strip 18 is attached to the back of the rear side 14 and is provided with slots 20 at the upper and lower ends thereof adapted to receive the L-shaped screws 22 which are fastened to any suitable support. It will be understood that the bird house may be readily demounted by turning the screws 22 from the position shown in Fig. 1 so that the heads of the screws may pass through the slots 20. The vertical marginal edges of the front and rear sides 12 and 14 are channeled to leave the lips 24 at the edges of the front side 12 and the lips 26 at the edges of the rear side 14. These lips 24 and 26 overlap the edges of the removable side panels 28 and 30 as shown in Fig. 4. The sides 28 and 30 are somewhat narrower in width than the space between the lips 24 and 26 whereby expansion of the sides 28 and 30 will not cause pressure against the lips 24 and 26.

I have devised a novel means of securing the removable sides 28 and 30 in such a manner that they may be readily and quickly secured in position or removed from the body of the bird house. As shown in Fig. 3 horizontal slots 32 are cut in the inner surfaces of the front and rear sides 12 and 14 and internally threaded metal sockets 34 are fixed within the slots or grooves 32 by the U-shaped staples 36 and 38. The staple 36 may extend over the socket as shown in Fig. 3 while the other staple 38 passes through an opening 40 at the inner end of the socket 34 and thereby serves to hold the inner end of the socket. The panels 28 and 30 are attached by the machine screws 42 which extend through openings in the marginal edges of the panels 28 and 30 and thread into the metal sockets 34. The metal sockets 34 are intended to be held by the staples 36 and 38 to prevent displacement but with some slight freedom of movement so that the screw 42 may move the socket into exact alignment as it is threaded into place.

When the device is used in the form of a closed bird house, it is desirable to provide for ventilation of the interior of the house and this is accomplished as shown in Fig. 3 by making the floor 10 somewhat narrower in width than the space between the sides 28 and 30 thus leaving the openings 44 through which air may pass into the interior of the bird house as shown by the arrow in Fig. 3. Similarly the sides are cut to terminate short of the roof 16 leaving the openings 46 through which air may pass out from the top of the bird house. As shown in Fig. 3, the sides 28 and 30 extend somewhat below the bottom of the floor piece 10 and thereby protect the openings 44 against entrance of snow and rain.

The birds may enter the house through the opening 48 near the top of the front side 12 as shown in Fig. 1. The opening 48 is the largest opening that would be used. If the bird house is to be restricted to smaller birds, one of the adapter plates 50 or 52 could be placed over the opening 48. It will be noted that the plate 50 has an opening 54 which is somewhat smaller than the opening 48 and that the plate 52 similarly has an opening 56 which is still smaller. These adapter plates 50 and 52 may be secured to the bottom of the bird house by the screws 58 as shown in Fig. 4 until they need to be used.

Figs. 8 and 9 disclose a modified form of bird house which in general is constructed the same as in Figs. 1 and 3 but in addition provision is made for a removable glass window 60 which fits at the sides in slots 62 cut in the side strips 64. The strips 64 are fixed to the inside faces of the front 12 and back 14. The glass window 60 is held against dropping out by the stop 66 which is adjustably fixed in position by the screw 68 threaded into the floor part 10 of the bird house. The removable side panel 30 may be placed in position as shown in Fig. 1 thereby covering up the window 60 while the nest is being built by the birds. Thereafter the side 30 may be removed or attached as shown in Fig. 8 in which the screws 42 fasten the top portion of the side 30 to the lower half of the bird house thereby exposing the window 60. The panels 28 and 30 and the window 60 may be removed if desired to convert the bird house to an open feeder as shown in Fig. 2.

The closed bird house may be converted to an open feeder as shown in Figs. 10 and 11 in which the sides have been removed and a feeding tray 70 has been assembled to rest on the floor 10. The feeding tray is secured in position by the same screws 42 that are used to fasten the removable side panel 30. The tray 70 has several upright pins 72 which serve to confine and hold in upright position a bottle or container 74 from which bird seed 76 is delivered to the tray 70. The mouth of the bottle or container may be spaced from the floor of the tray by the rest member 78 to allow the seed to flow from the inverted bottle 74.

The bird house, as previously stated, is made essentially of wood parts. Nails are required to fasten the floor and roof to the front and rear walls and to attach the mounting strip; and the metal machine screws and socket members constitute the novel fastening means for securing the removable side panels. The wooden parts are so arranged that each part is free to expand without damaging the house or loosening the fastening elements. Thus in the side panels the grain runs vertically and lateral expansion of the panels is permitted due to the space provided between the side edges and the overlapping lips of the front and rear walls. The floor is free to expand since it is cut narrower in width than the space between the side panels leaving the ventilating openings between the floor and the side panels. The provision of the permanently fixed internally threaded socket members makes it very easy to quickly attach or remove the side panels and to secure in position the rack or other food holding means. It should be noted that the side walls extend downwardly beyond the underneath surface of the floor. This overlapping tends to prevent snow or rain from being blown into the bird house through the ventilating openings, and also prevents the formation of icicles on the bottom of the bird house as the water will readily drop off the bottom edges of the side walls.

The provision of the adapter plates is a very useful feature since certain birds will only enter bird houses having a particular size hole or opening. If it is desired to attract birds of a certain variety, the proper size of opening is selected for the birds to enter the house. The bird house may be used by one variety of birds one season and by another variety of birds another season, thereby making it unnecessary to have a plurality of bird houses with different size holes. The ventilating openings also aid in causing the birds to use the house since the birds may be afraid to enter the house unless they can see the interior. The ventilating openings admit light to the interior of the house.

I claim:

A bird house comprising front and rear walls, a floor extending between said front and rear walls, a roof fixed to the upper ends of said front and rear walls, said front wall having an opening to admit birds to the interior of said bird house, said bird house having removable side wall members, said side wall members fitting tightly against said front and rear walls, said floor being narrower in width than the distance between said side walls whereby ventilating openings are provided to admit air into the bird house between said floor and said side walls, said bird house also having ventilating openings between the upper ends of said side walls and the roof of said bird house to permit the escape of air from said house.

DONALD B. HYDE.